(12) United States Patent
Horikoshi

(10) Patent No.: US 8,201,946 B2
(45) Date of Patent: Jun. 19, 2012

(54) PROJECTION IMAGE DISPLAY APPARATUS AND POLARIZATION CONVERTER WITH OPTIMALLY ALIGNED PHASE DIFFERENCE PLATES

(75) Inventor: Ryoko Horikoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 393 days.

(21) Appl. No.: 12/268,565

(22) Filed: Nov. 11, 2008

(65) Prior Publication Data

US 2009/0135316 A1 May 28, 2009

(30) Foreign Application Priority Data

Nov. 28, 2007 (JP) ................................. 2007-307880

(51) Int. Cl.
*G03B 21/14* (2006.01)
*G02B 5/30* (2006.01)
(52) U.S. Cl. ..................................... 353/20; 359/485.01
(58) Field of Classification Search .................... 353/20; 359/485, 486.01–486.03, 489.01, 489.07–489.09, 359/489.11, 489.15–489.17, 485.01
See application file for complete search history.

(56) References Cited

U.S. PATENT DOCUMENTS

| | | | |
|---|---|---|---|
| 6,257,726 B1 * | 7/2001 | Okuyama | 353/20 |
| RE39,951 E | 12/2007 | Itoh et al. | |
| 2007/0291357 A1 * | 12/2007 | Oto | 359/485 |

FOREIGN PATENT DOCUMENTS

| | | |
|---|---|---|
| CN | 1108532 | 5/2003 |
| JP | 11-242186 | 9/1999 |
| JP | 2003-302523 A | 10/2003 |
| JP | 2004-170853 A | 6/2004 |
| JP | 2005-062636 | 3/2005 |
| JP | 2005-274705 | 10/2005 |
| JP | 2007-232900 | 9/2007 |

* cited by examiner

*Primary Examiner* — Thanh X Luu
(74) *Attorney, Agent, or Firm* — Wolf, Greenfield & Sacks, P.C.

(57) ABSTRACT

Disclosed is a projection image display apparatus which includes a light source; and an illumination optics including a phase difference plate. The illumination optics is configured to form an image on a liquid crystal panel with light beams emitted from the light source. The phase difference plate has a deviation in viewing angle characteristics and is arranged to yield a desirable phase difference for a light beam directed in a direction of high intensity among incident light beams distributed at various angles.

7 Claims, 13 Drawing Sheets

REFERENCE PLANE

FIG. 6
UNIT: JND
|  | 9 POINTS WORST | 13 POINTS WORST |
|---|---|---|
| FILM TYPE | 1.0 | 1.5 |
| QUARTZ HALF-WAVE PLATE (WITH AXES ALIGNED IN UNIFORM) | 3.1 | 5.0 |
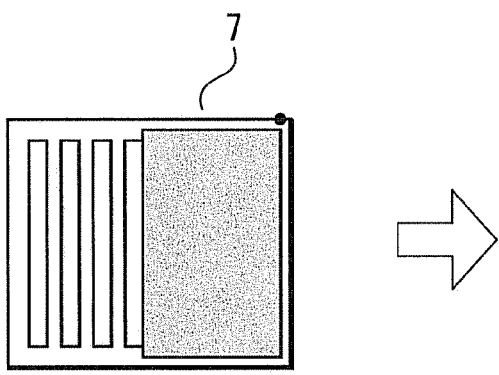
FIG. 7A
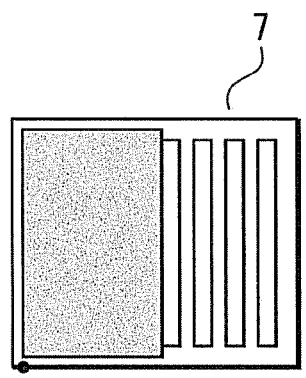
FIG. 7B

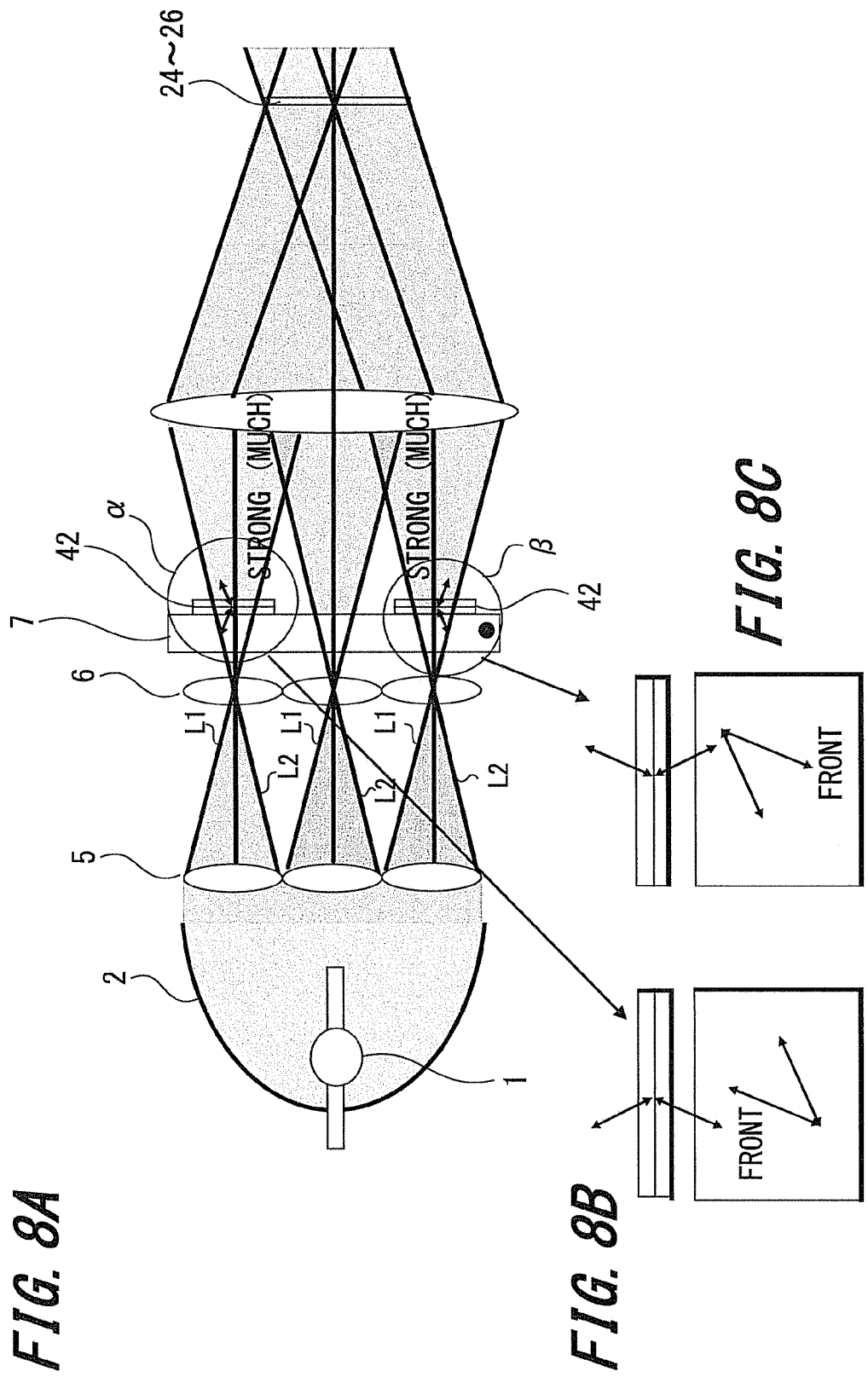

*FIG. 9*

UNIT: JND

|  | 9 POINTS WORST | 13 POINTS WORST |
|---|---|---|
| QUARTZ HALF-WAVE PLATE (WITH AXES ALIGNED TO BE POINT-SYMMETRIC) | 1.6 | 2.7 |

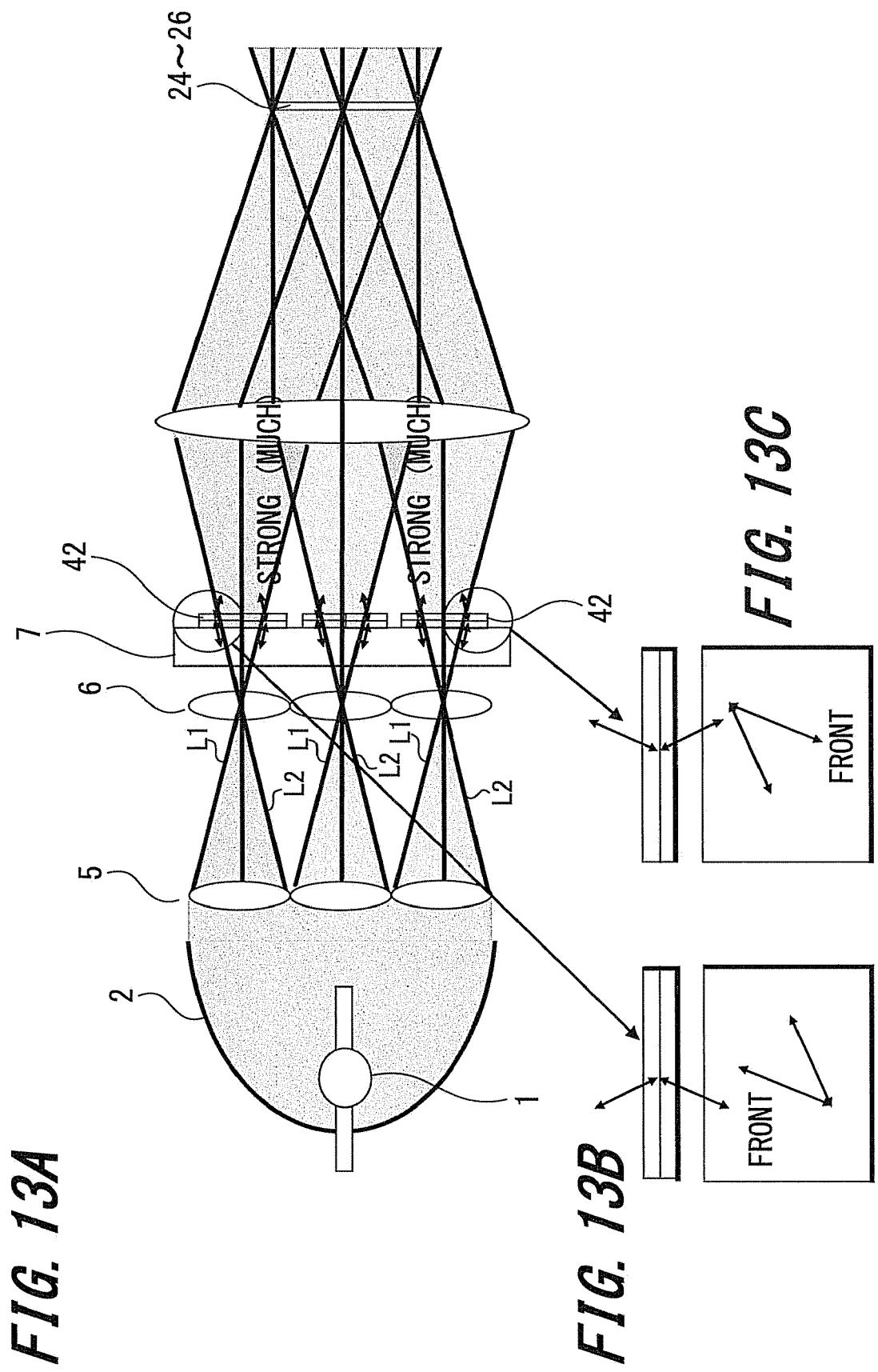

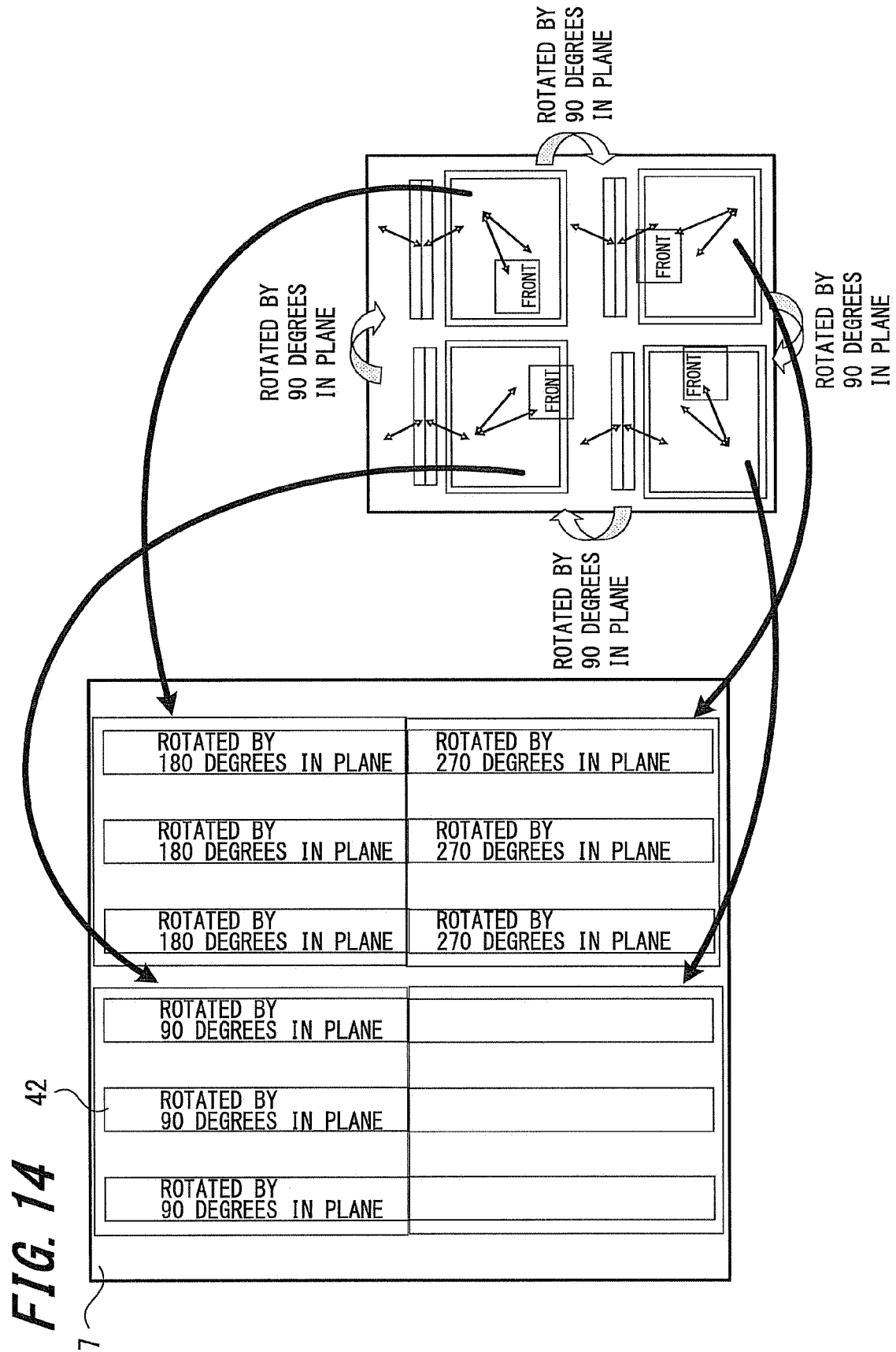

PROJECTION IMAGE DISPLAY APPARATUS AND POLARIZATION CONVERTER WITH OPTIMALLY ALIGNED PHASE DIFFERENCE PLATES

CROSS REFERENCES TO RELATED APPLICATIONS

The present invention contains subject matter related to Japanese Patent Application JP 2007-307880 filed in the Japanese Patent Office on Nov. 28, 2007, the entire contents of which being incorporated herein by reference.

BACKGROUND OF THE INVENTION

1. Field of the Invention

The invention generally relates to projection image display apparatuses and polarization converters. More particularly, the invention relates to a projection image display apparatus including an illumination optics incorporating a polarization converter and wave difference plates.

2. Background Art

Projection image display apparatuses (projectors) have been used for purposes of conducting enlarged projections of presentation documents in the course of meeting and lecture. Since the projection image display apparatuses of such use are often subjected to bright indoor environments unlike for home use, efforts have been in progress for increasing luminance.

In addition, miniaturization of the apparatuses is a general trend for achieving low costs, and the luminous density in optical system has been ever increasing, as a result. While the amount of air flow for cooling may need to increase with such increase in luminous density, it is desirable to obtain quieter performance even for the apparatuses of high luminance. In order to align the state of light polarization efficiently in such projection image display apparatuses, a PS converter (polarization conversion element) has been used.

Such a PS converter is configured to separate P-polarized light and S-polarized light with a PBS (polarization beam splitter) film, and allow one of the P-polarized light and the S-polarized light to pass through a half-wave plate while rotated by 90 degrees, whereas the direction of light polarization is aligned in a single direction. Although a polycarbonate film is generally used for forming the half-wave plate, degradation of its optical characteristic caused by yellowing or burnt may become a problem with the increase in the light density.

In order to improve durability and heat-resistance, a PS converter using a wavelength plate of quartz in place of the polycarbonate film is disclosed in Japanese Unexamined Patent Application Publication No. 2003-302523. Since such a wavelength plate is designed to yield a phase difference of λ/2 at a certain wavelength, its effective range of wavelength is relatively narrow in general.

In order to increase the effective wavelength range, a technology of laminating a plurality of wavelength plates after suitably aligning their directions is disclosed to be known previously (described in *Crystal Optics*, the first edition in 1975, which is edited by Optics Forum of the Japan Society of Applied Physics, and published by Morikita Shuppan Co., Ltd., Japan). A quartz wavelength plate using such technologies is also disclosed in Japanese Unexamined Patent Application Publication No. 2004-170853.

SUMMARY OF THE INVENTION

In the case where a half-wave plate is formed with the structure including the optical axis of quartz placed in plane as described in the aforementioned Japanese Unexamined Patent Application Publication No. 2003-302523, two quart plates are used to constitute a zero order wavelength plate. Since the PS converter is designed to yield a phase difference equal to λ/2 at the wavelength of green light, for example, when thus formed PS converter of the two-sheet composition is mounted in an actual apparatus, conversion efficiency decreases for red and blue light and chromaticity of the apparatus is degraded. In order to obtain sufficient efficiency in broader wavelength range, another two-sheet composition may further be required for the wavelength plate, thereby four or more quartz sheets in total being included. With such increase in the wave plate thickness, the structure tends to be more expensive. Also, the increase in quartz plate thickness considerably affects the luminance of the apparatus as the whole, which is not advantageous for the above-mentioned trend for higher luminance.

On the other hand, another technology is also known for forming a zero order wavelength plate with one quartz wafer, which contains no optical axis in plane and is cut aslant with respect to the optical axis. Since a broad wavelength range can be obtained with as few as two wafers in this technology, it is advantageous with respect to thickness and costs. However, because of the axis cut aslant, phase difference may vary considerably with the direction and angle of incidence of light. With such a variation in the phase difference depending on the direction and angle of incidence of light, luminance unevenness is generated on a plain white screen when mounted in an actual apparatus. In order to obtain optical characteristics comparable to film wavelength plate, in addition to the rather complicated structure as described in the aforementioned Japanese Unexamined Patent Application Publication No. 2004-170853, the thickness of plate may need to be decreased as much as possible. With the decrease in thickness, difficulties during processing increase, and this has considerably influenced production yield and costs.

As described above, it is difficult to improve simultaneously the luminance, chromaticity, uniformity, and production costs in the related art of using quartz for forming the half-wave plate included in a PS converter.

In addition, although illustrations have been made hereinabove with regard to PS converters, phase difference plates are used in several locations other than the PS converter in illumination optics of the projector. For example, preceding a color composition prism for compounding light beams outgoing from R, G, and B liquid crystal panels, P-polarized light beams outgoing from the B and R channels are converted into S-polarized light beams with the half-wave plate (in an alternative case where light beams outgoing from the B and R channels are S-polarized, only S-polarized light beams outgoing from G channel are converted with the half-wave plate into P-polarized beams).

Moreover, since the illumination optics of the projection image display apparatus is a polarization optical system, there are the cases using not only half-wave plates but also other variety of phase difference plates (including quarter-wave plate and λ-plate).

In the case where quartz wavelength plates are used for forming these wavelength plates, it is similarly difficult to simultaneously improve the luminance, chromaticity, uniformity, and production costs of the projection image display apparatus.

It is desirable to provide a projection image display apparatus at low cost which has high luminance capabilities without degrading optical characteristics.

According to an embodiment of the present invention, there is provided a projection image display apparatus including a light source; and an illumination optics including a phase difference plate and forming an image on a liquid crystal panel with light beams emitted from the light source. A phase difference plate having an deviation in viewing angle characteristics is arranged to yield a desirable phase difference for a light beam directed in the direction of high intensity among incident light beams distributed at various angles.

When light intensity distribution is analyzed at various locations in the illumination optics of projection image display apparatus, a certain degree of deviation may be always generated depending on the location for light beams incident at various angles.

With the projection image display apparatus according to an embodiment of the present invention, a phase difference plate having deviation in the viewing angle characteristics is used as a phase difference plate included in the illumination optics. The arrangement direction of the phase difference plates is optimized in response to the deviation of light intensity at the location (arranged so as to yield a desirable phase difference for the light directed in the direction of high intensity). Accordingly, the luminance, chromaticity, uniformity, and production costs of the projection image display apparatus are simultaneously improved.

In the case where the phase difference plate is a half-wave plate included in the polarization converter, it is preferable for the half-wave plate to be arranged so as to increase a conversion efficiency of a light beam directed in the direction of high intensity among incident light beams distributed at various angles.

According to another embodiment of the present invention, there is provided a polarization converter separating P-polarized light and S-polarized light from incident light and aligning the direction of polarization of outgoing light beams. The polarization converter includes a half-wave plate configured to allow one of the P-polarized light and the S-polarized light to pass through. The half-wave plate having a deviation in viewing angle characteristics is arranged to increase a conversion efficiency of a light beam directed in the direction of high intensity among incident light beams distributed at various angles.

The polarization converter uses the half-wave plate having the configuration of the phase difference plate of the above-mentioned projection image display apparatus according to an embodiment of the invention. As a result, the luminance, chromaticity, uniformity, and production costs of the projection image display apparatus are simultaneously improved by incorporating the polarization converter into illumination optics as a constituent of the display apparatus.

According to an embodiment of the invention, the luminance, chromaticity, uniformity, and production costs of a projection image display apparatus are simultaneously improved, and the projection image display apparatus can be provided at low cost without degrading optical characteristics yet obtaining high luminance.

BRIEF DESCRIPTION OF THE DRAWINGS

FIG. 6 is a table showing the results of the measurements of color uniformity for the half-wave plate configuration shown in FIGS. 5A and 5B.

FIGS. 7A and 7B are drawings illustrating the arrangement of PS converter during light transmission measurements with the right half portion shaded and with the left half portion shaded after inverting the converter, respectively.

FIGS. 8A, 8B and 8C are drawings schematically illustrating the configuration of half-wave plates included in PS converter viewed from the top of the optical system, the half-wave plate disposed in the region α viewed from the direction of light incidence, and the half-wave plate disposed in the region β viewed from the direction of light incidence, respectively.

FIG. 9 is a table showing the results of the measurements of color uniformity for the half-wave plate configuration shown in FIGS. 8A, 8B and 8C.

FIGS. 13A to 13C are drawings illustrating the examples of combination formed by dividing each rectangular slab of the half-wave plate into right and left halves.

FIG. 14 is a drawing illustrating the PS converter, in which each of half-wave plates is divided into top and bottom portions to subsequently be laminated to form a point-symmetric alignment.

DESCRIPTION OF THE PREFERRED EMBODIMENTS

Figure 1:
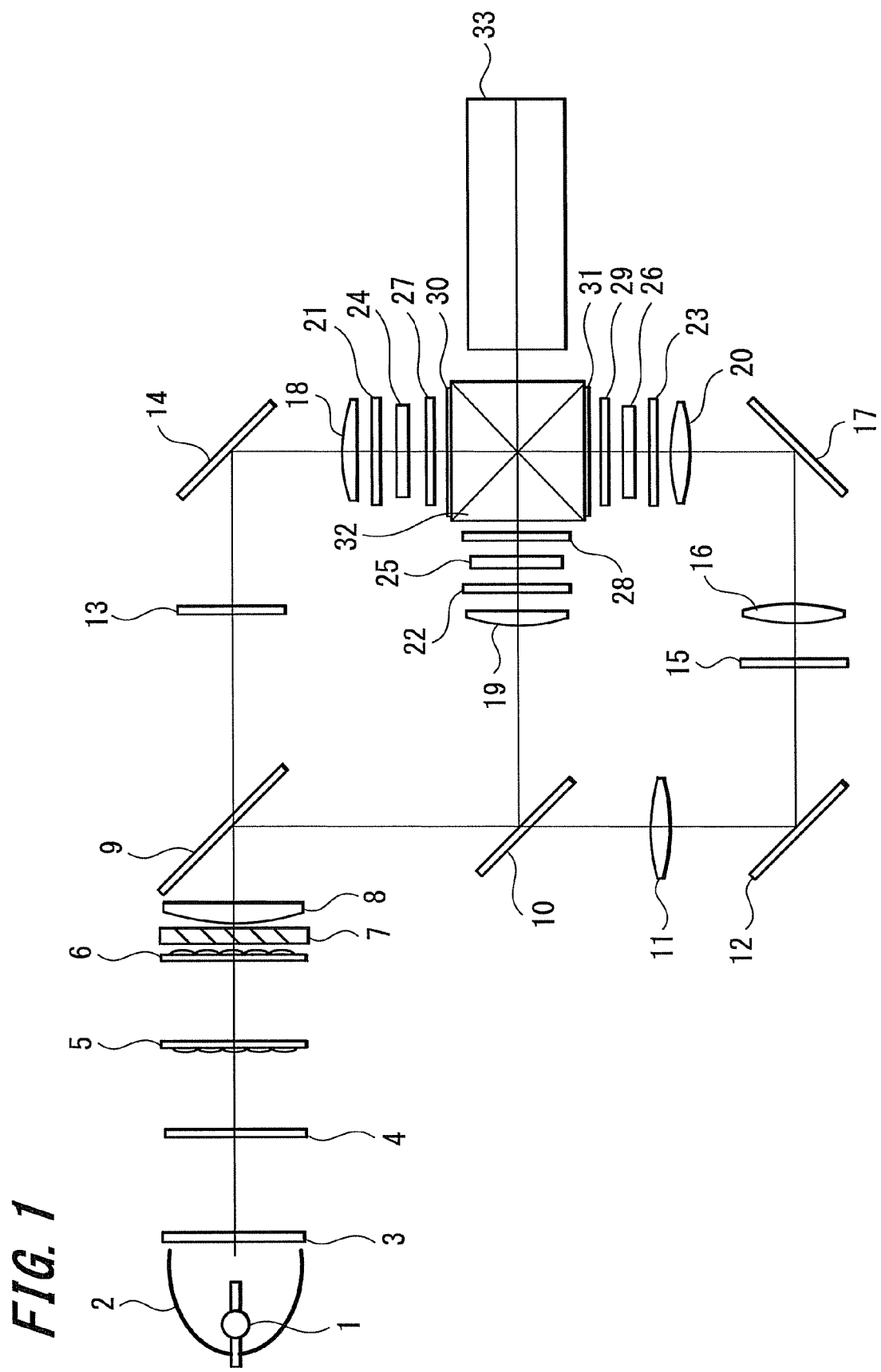
FIG. 1 is a schematic view illustrating the fundamental configuration of an optical system of a projection image display apparatus according to an embodiment of the present invention.

Embodiments of the present invention will be described hereinbelow by referring to the accompanying drawings. It is not intended to be exhaustive or to limit the invention to those disclosed in the embodiments and illustrated in the drawings.

FIG. 1 is a schematic view illustrating the fundamental configuration of an optical system of a projection image display apparatus (projector) according to an embodiment of the present invention.

Referring to FIG. 1, white natural light emitted from an ultra-high pressure mercury lamp as the light source 1 in the optical system according to an embodiment of the invention, is reflected by a reflector 2, propagates through an explosion-proof glass 3 covering the light emitting face of the reflector 2, and is incident on a UV-blocking filter 4. The UV light beams are filtered out through reflection with the UV-blocking filter 4. Light beams outgoing from the UV-blocking filter 4 are made incident on first fly's eye lens 5 as one of first and second fly's eye lenses, 5 and 6, which constitute an integrator of the system, subsequently condensed by the second fly's eye lens 6, and further allowed to be incident on a PS converter 7.

Light beams outgoing from the PS converter 7 are collected by a condenser lens 8 and made incident on a GR reflection dichroic mirror 9.

The GR reflection dichroic mirror 9 is configured to allow blue light beams to pass through, while to reflect green and red light beams. The blue light beams transmitted through the GR reflection dichroic mirror 9 are filtered by a UV absorption filter 13 for filtering off the UV light therefrom through UV absorption, reflected by a blue light reflection mirror 14, collected by a blue light condenser lens 18, transmitted through an incident polarization plate 21, and subsequently incident on a blue light LC (liquid crystal) display panel 24.

Following the reflection by the GR reflection dichroic mirror 9, the green and red light beams are incident on a G reflection dichroic mirror 10. The G reflection dichroic mirror 10 reflects green light beam, while allowing red light beams to pass through. The green light beams reflected by the G reflection dichroic mirror 10, are collected by a green light condenser lens 19, transmitted through another incident polarization plate 22, and subsequently incident on a green light LC display panel 25.

Subsequent to being transmitted through the G reflection dichroic mirror 10, the red light beams are directed to pass a first relay lens 11, reflected by a red light reflection mirror 12, filtered by a R transmission filter 15 for filtering off the other light components than the red therefrom. Subsequently, the red light beams are directed to pass a second relay lens 16, reflected by another red light reflection mirror 17, collected by a red light condenser lens 20, and subsequently incident on a red light LC display panel 26.

The blue, green, and red light beams which are incident on the LC panels 24, 25, and 26, are subjected to modulation in response to the level of B, G, and R picture signals, respectively. Blue, green, and red light beams which are outgoing from the LC panels 24, 25, and 26, are directed to be incident on outgoing polarizing plates 27, 28, and 29, respectively. The outgoing polarizing plates 27, 28, and 29 respectively allow only P-polarized light to be transmitted through.

The blue and red light beams transmitted through outgoing polarizing plates 27 and 29, are converted into S polarization from P polarization with half-wave films 30 and 31, respectively, and directed to be incident on a color composition prism 32. The green light beams transmitted through another outgoing polarizing plate 28 are directed to be incident on the color composition prism 32 without conversion. In the color composition prism 32, P-polarized light beams are allowed to transmit through, while S-polarized light beams are reflected in the same direction as the P-polarized light beams. As a result, the green, blue, and red light beams are synthesized. Light beams outgoing from the color composition prism 32 are subjected then to enlarged projection onto a screen (not shown) through a projection lens 33.

Figure 2:
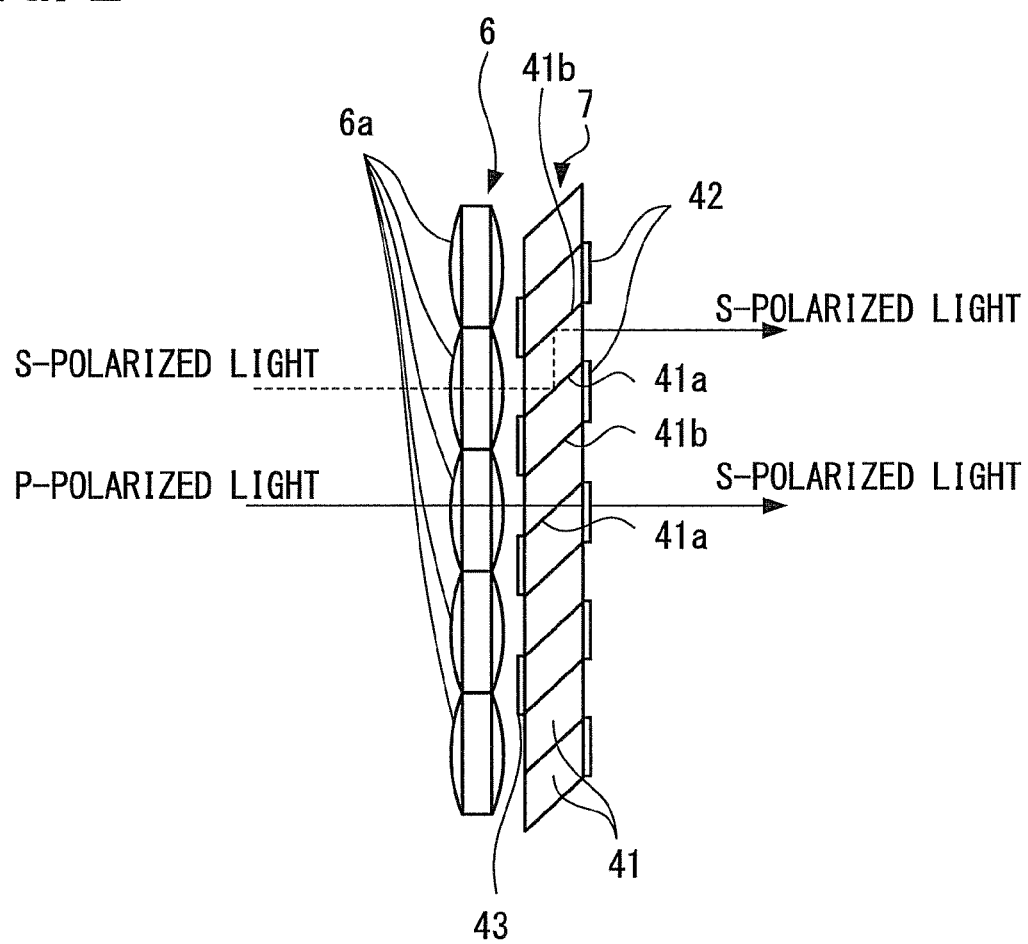
FIG. 2 is a schematic view illustrating the fundamental construction of a PS converter included in the optical system of FIG. 1.

FIG. 2 is a schematic view illustrating the fundamental construction of the PS converter 7 included in the optical system of FIG. 1. Referring to FIG. 2, the PS converter 7 is formed by fixing a plurality of small prisms 41 onto lenses 6a included in the second fly's eye lens 6 such that each of the prisms 41 corresponds to each of the lens 6a. Alternately along the face of the fixing, there are formed (a) PBS (polarization beam splitter) surfaces 41a for allowing P-polarized light, out of the light outgoing from the center potion of the lens 6a, to pass through, while reflecting S-polarized light, and (b) reflecting surfaces 41b for reflecting the S-polarized light, reflected by the PBS surface 41a, toward the condenser lens 8 of FIG. 1. In addition, half-wave plates 42 are each fixed on the surfaces among those of prisms 41, from which the transmitted P-polarized light outgoes. Moreover, shading plates 43 are each placed on surfaces among those of prisms 41, on which the light beams outgoing from the peripheral portions of lenses 6a are incident.

Among the light outgoing from the center potion of the lens 6a, P-polarized light transmitted through the PBS surface 41a is subsequently converted into S-polarized light with the half-wave plate 42 and directed toward the condenser lens 8, while S-polarized light is reflected first by the PBS surface 41a and then the reflecting surfaces 41b, and directed toward the condenser lens 8. Accordingly, the light (natural light) beams incident on the PS converter 7 are allowed to outgo from the PS converter 7 uniformly in the polarization direction of the S polarization.

The PS converter 7 includes half-wave plates 42 of quartz, and has a specific configuration regarding the arrangement of the half-wave plates 42. Prior to the description on the configuration of half-wave plates 42, the ground for adopting such configuration is described.

Figure 3:
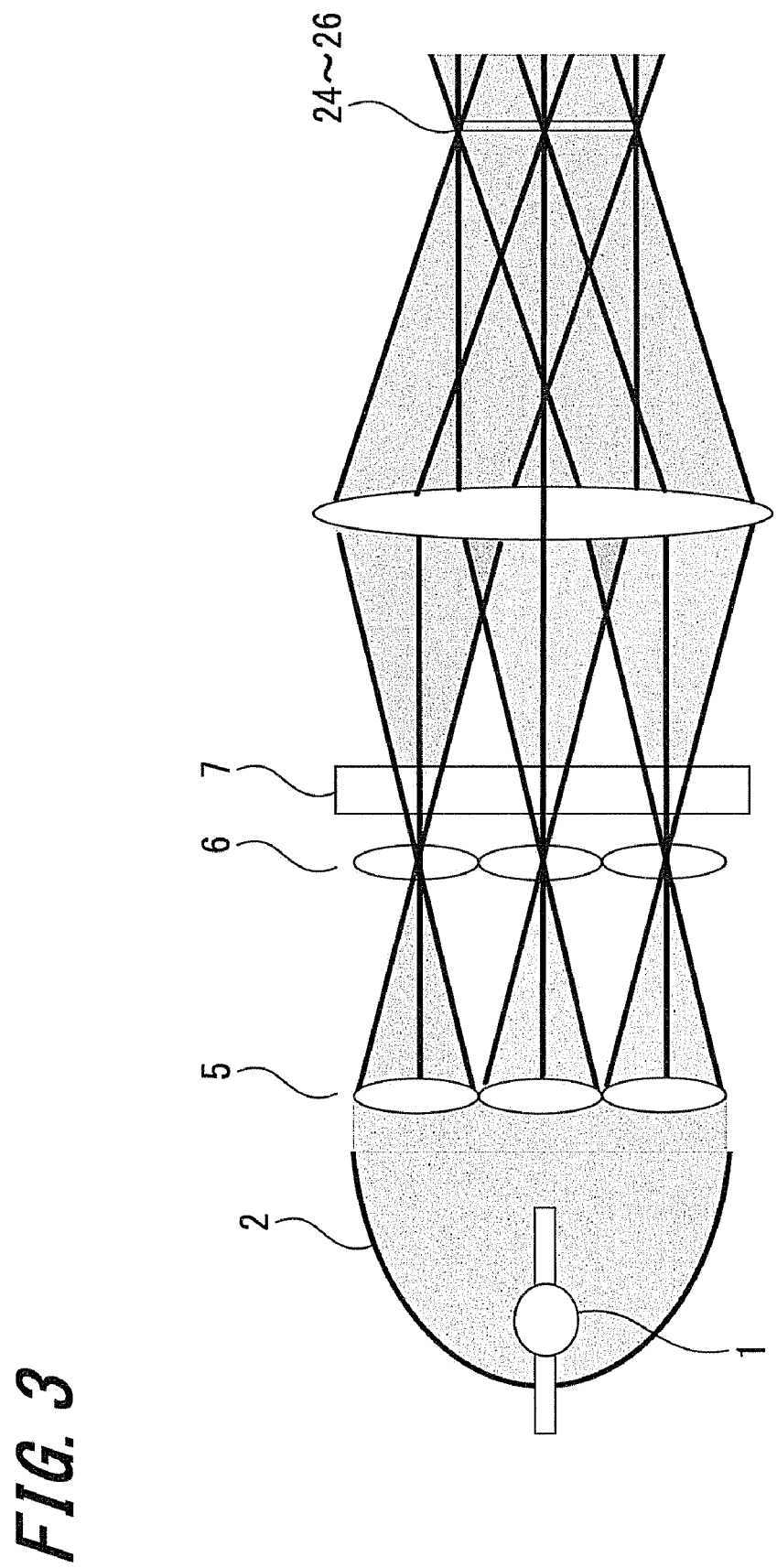
FIG. 3 is a schematic view conceptually illustrating the state of light beams propagating through an illumination optics of FIG. 1.

FIG. 3 is a schematic view conceptually illustrating the state of light beams propagating through illumination optics of FIG. 1. (It should be noted that this drawing is prepared for illustrating basic conception, but not for describing design details.)

Light beams emitted from the light source 1 are reflected by the reflector 2; incident on the first fly's eye lens 5 to thereafter be divided into a plurality of light beams, then made incident on corresponding second fly's eye lens 6; and subsequently form an image by being superposed on respective LC display panels 24, 25, and 26. Since the light beams form an image on LC display panels 24, 25, and 26 with incidence at respective angles as shown in the drawing, the light intensity distribution over the LC display panels 24, 25, and 26 shows the reflection of angular distribution of the light incident on the PS converter 7.

Light beams incident on the half-wave plate fixed on the outgoing surface of the PS converter 7 (i.e., half-wave plates 42 of FIG. 2) have angle variations of several degrees. In addition, the light beams are not uniform in intensity, but are distributed with a certain deviation. Such deviation is due to the intensity distribution of light emitted from the light source 1 and the design of the fly's eye lenses 5 and 6. In general, the light directed from the center to outside has a higher intensity, while the opposite case may arise as the case of decentering, in that the light intensity is stronger for the beam directed from outside to inside. There will be described hereinbelow on the example in the latter case, of optimizing the axial direction of the half-wave plate of the PS converter 7.

Figure 4A:
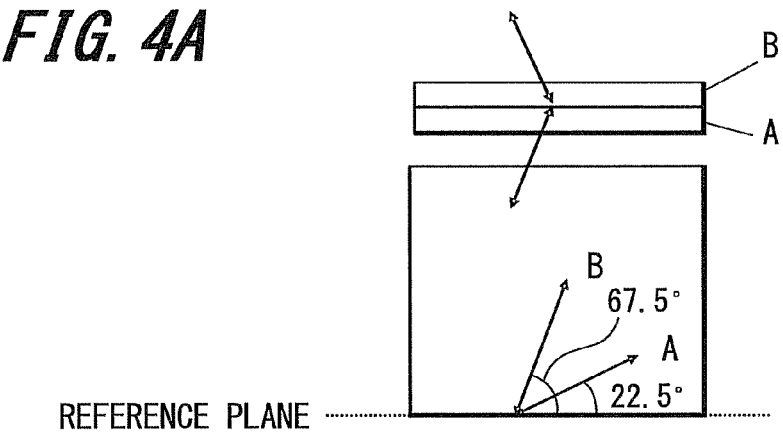
FIGS. 4A, 4B and 4C are drawings illustrating the structure, viewing angle characteristics, and transmittance values of half-wave plates included in the PS inverter shown in FIG. 1, respectively.

FIG. 4A is a drawing schematically illustrating a quartz half-wave plate 42 of the PS converter 7 viewed from the direction of light incidence. Two identical half-wave plates A and B are prepared, each being a single zero-order quartz half-wave plate which is designed to have a thickness such that the phase difference is equal to $\lambda/2$ at the wavelength of 520 nm. The two plates are subsequently laminated after rotating one by 45 degrees relative to the other, and the thus formed structure is disposed such that the half-wave plate A makes an angle of 22.5 degrees relative to a reference plane, as shown in FIG. 4A, thereby forming the half-wave plate 42.

Figure 4B:
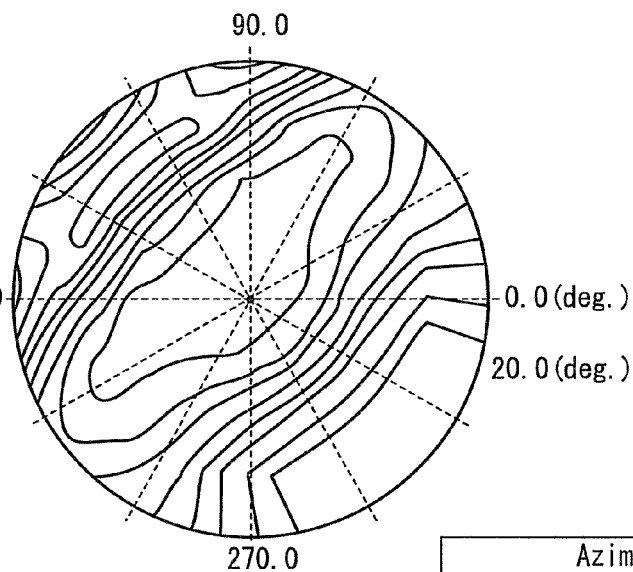

FIG. 4B is a drawing illustrating viewing angle characteristics of the quartz half-wave plate 42 of the structure shown in FIG. 4A with an isoluminance contour. It is indicated that a deviation arises in the viewing angle characteristics of the quartz half-wave plate 42.

Figure 4C:
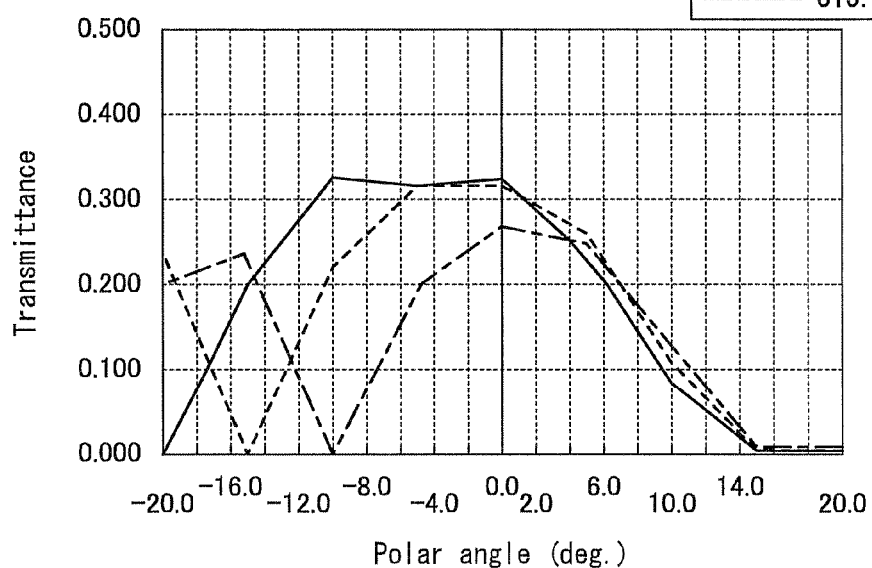

FIG. 4C is a graph showing the change in transmittance illustrated along the sectional line of the viewing angle characteristics plots of FIG. 4B, in which the sectional line is drawn from 135 degrees to 315 degrees of the azimuth angle. The changes in transmittance are shown in the drawing at three wavelengths of 450 nm (blue light), 550 nm (green light), and 650 nm (red light). In the spatial region ranging from +6 degrees to −6 degrees of the polar angle, it is observed that, for the light in the direction of the azimuth angle of 315 degrees, the transmittance decreases with the increase of the polar angle at the abovementioned three wavelengths, while the transmittance for the light in the 135 degrees azimuth direction decreases only at the blue light wavelength.

For characteristics of the projector, the results indicate that the brightness decreases in the direction of the azimuth angle of 315 degrees, while the color efficiency decreases for blue light compared with green light and red light in the direction of the azimuth angle of 135 degrees, and that the chromaticity is degraded in projector characteristics, as a result. As to the brightness, the above mentioned results have little influence thereon after the decrease of only blue light efficiency, because the effect of green light is dominant in the projector characteristics.

Therefore, in the case where wavelength plates having deviation in the viewing angle characteristics are incorporated into a projection apparatus, unevenness in the luminance and/or degradation of the chromaticity may be caused depending on the direction, angle, and intensity of incident light.

Figures 5A, 5B:
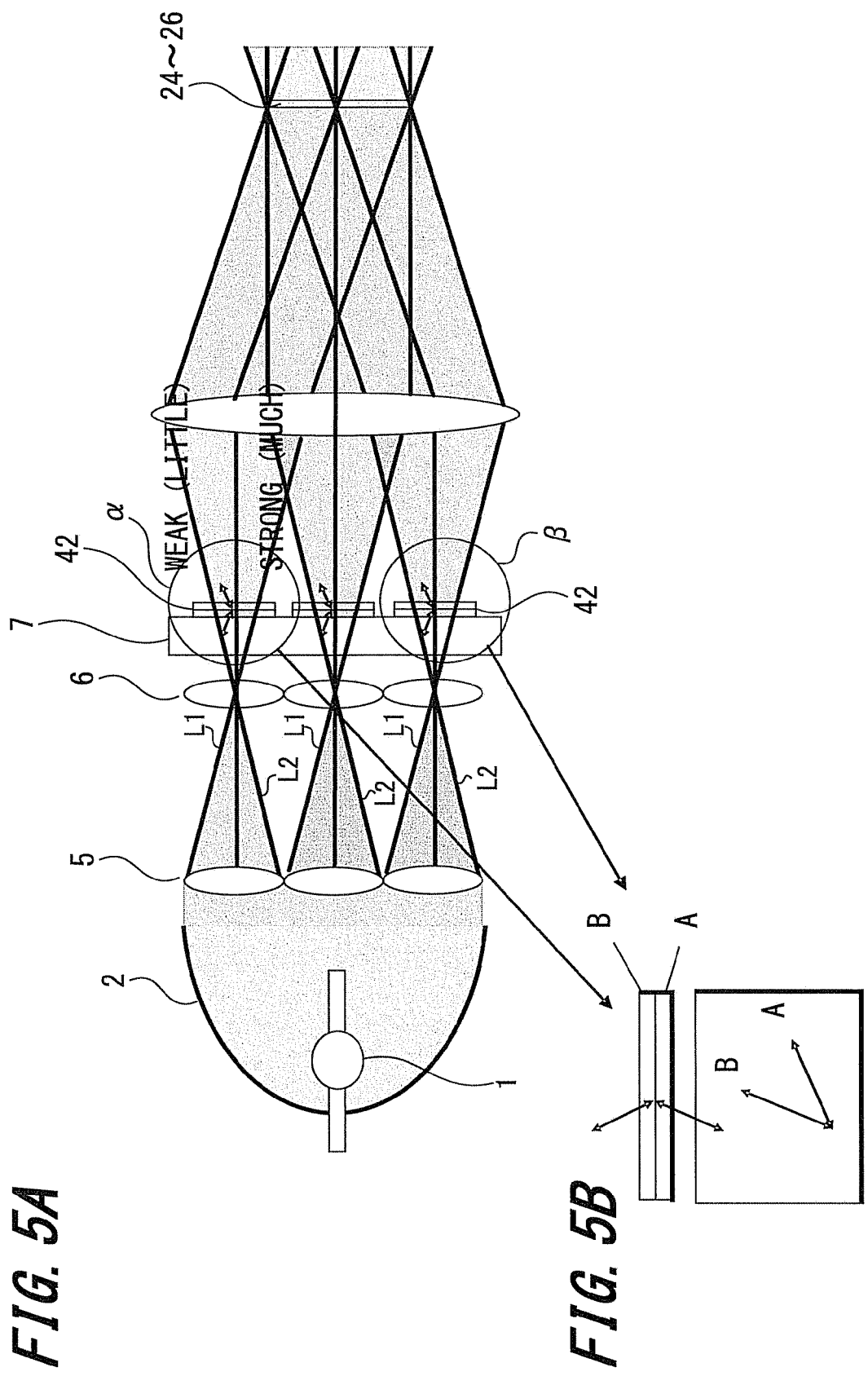
FIGS. 5A and 5B are drawings schematically illustrating half-wave plates, which have the configuration of FIG. 4A and are disposed on the outgoing surface of PS converter with the direction of the axes of half-wave plate aligned in uniform.

FIG. 5A is a drawing schematically illustrating half-wave plates, in which the half-wave plates 42 with the configuration of FIG. 4A are disposed on the outgoing surface of PS converter 7 with the direction of the axes of half-wave plates aligned in uniform, when viewed from the top of the optical system. FIG. 5B is a drawing schematically illustrating the half-wave plate 42 of FIG. 5A viewed from the direction of light incidence.

With the half-wave plate configuration shown in FIGS. 5A and 5B, and when a plain white image is projected on a screen, dense unevenness comes to arise diagonally on screen. When color uniformity is measured, the results are obtained as shown in FIG. 6, indicating that the uniformity with the present configuration is degraded in comparison with PS converter of typical film type used as a reference.

In order to examine the cause of the uniformity degradation, the brightness was measured first for the case where the left half portion, viewed from the direction of light incidence on the PS converter 7, is shaded and the light is allowed to pass through the right half portion, and secondly for the case where the right half portion is shaded and the light is allowed to pass through the left half portion, and the results obtained from the measurements were compared. From the results it is found that the light transmitted from the right half is darker by 3% compared with that from the left half.

In contrast, a further study is made on the case where a measurement was carried out with the right half portion of the PS converter 7, viewed from the direction of light incidence being shaded, as shown in FIG. 7A, and subsequently another measurement with the right half portion being again shaded but with the PS converter 7 disposed in the optical system having its orientation inverted as shown in FIG. 7B. It has been found that the brightness obtained for the first measurement is recovered in the subsequent measurement. Since the PS converter 7 has been rotated in plane by 180 degrees during the abovementioned inversion and light beams have been distributed to be point symmetric, the relation between the light beams and the optical axes of quartz wave-plate has not changed before and after the rotation. Accordingly, the result shows that the intensity of light transmitted through the right half of the optical system is affected by the wave-plate to be reduced.

Referring again to the schematic drawing of FIG. 5A, the behavior of light beams is examined. With regard to the optical system used for present measurements, light beams having the angular distribution directed to the center from the outside, viewed from the side of light incidence, are greater in intensity. That is, in the region encircled with the notation "α" in FIG. 5A, the light beams L1 directed toward the right are stronger, while the beams L2 directed toward the left are weaker. Conversely, in the region encircled with the notation "β" in FIG. 5A, the light beams L2 directed toward the left are stronger, while the beams L1 directed toward the right are weaker.

It has turned out that the results of the aforementioned measurements on the comparison of brightness by shading either half of the portion of the PS converter correspond to the behavior of light described above, in which the efficiency of the converter is compared between the top and bottom halves in the configuration of FIG. 5A. That is, there examined in those measurements is which conversion efficiency is more advantageous in regard to the configuration of light beams and quartz optical axes between the regions α and β. Since the light beams L1 directed toward the right are stronger than the beams L2 directed toward the left in the region α, the waveplate is effective for the light beams L1 directed toward the right. By contrast, since the light beams L2 directed toward the left are stronger in the region β, the wave-plate is effective for the light beams L2 directed toward the left. As a result, the configuration of light beams and quartz optical axes in the region α is more advantageous than that in the region β.

Since the viewing angle characteristics of the half-wave plate are as shown in FIG. 4B and when viewed from the incidence side, the transmittance of the left half is higher than the right half. When the result is applied to the half-wave plate of FIG. 5A, strong light beams L1 are incident from the left half in the region α and the half-wave plate is disposed with the alignment to increase the transmittance of the strong light beams. By contrast, strong light beams L2 are incident from the right half in the region β and the transmittance decreases to become darker, and the simulation results are therefore found consistent with the measurements.

Accordingly, it is expected the transmission efficiency can be improved for both left and right sides of light beams by changing the arrangement of the quartz half-wave plate in the region β of FIG. 5A such that the configuration of light beams relative to the optical axes of quartz in that region is brought to such pattern as in the region α (i.e., by rotating in plane by 180 degrees).

Several examples will be described with regard to the arrangement of half-wave plates 42 of PS converter 7 of FIG. 1, which is used according to the results obtained from the abovementioned examination.

FIG. 8A is a drawing schematically illustrating the configuration of half-wave plates 42 included in the PS converter 7 when viewed from the top of the optical system. The optical axes of half-wave plates are aligned to be advantageous with respect to the angular, and intensity distribution of the incident light. With the direction for the advantageous alignment, the rotation efficiency of light beams is improved and the transmittance under the conditions of crossed Nicols is improved.

FIG. 8B is a drawing schematically illustrating a half-wave plate 42 disposed in the region α of FIG. 8A, viewed from the direction of light incidence (the optical axis indicated with "front" is the optical axis of the quartz wave-plate on the incidence side). The wave plates with the same viewing angle characteristics as those shown in FIGS. 5A and 5B are arranged as the half-wave plates 42 in the region α.

FIG. 8C is a drawing schematically illustrating a half-wave plate 42 disposed in the region β of FIG. 8A, viewed from the direction of light incidence. In the arrangement of the half-wave plates 42 in the region β, the wave plates are disposed to be rotated in plane by 180 degrees relative to the half-wave plate 42 in the region α and to be point-symmetric with each other.

With the half-wave plate configuration shown in FIGS. 8A, 8B, and 8C, a plain white image is projected on a screen. When color uniformity is measured with the configuration, the results are obtained as shown in FIG. 9, indicating that unevenness in luminance is improved comparing with the results shown in FIG. 6. It is indicated from the results that the unevenness in luminance and the chromaticity are improved when the optical axes of quartz are suitably aligned to be advantageous with respect to the angular, and intensity distribution of the incident light.

Figure 10A:
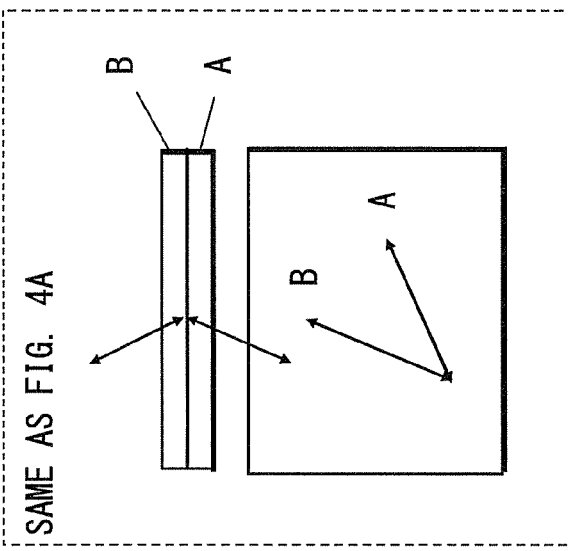
FIGS. 10A, 10B, and 10C are drawings schematically illustrating the configuration of half-wave plates included in PS converter viewed from the direction of light incidence, respectively, illustrating the configuration pattern of half-wave plates formed through lamination, which yields the same viewing angle characteristics as FIG. 4A.
Figure 10B:
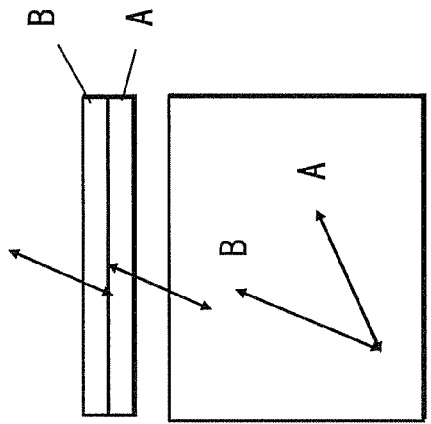
Figure 10C:
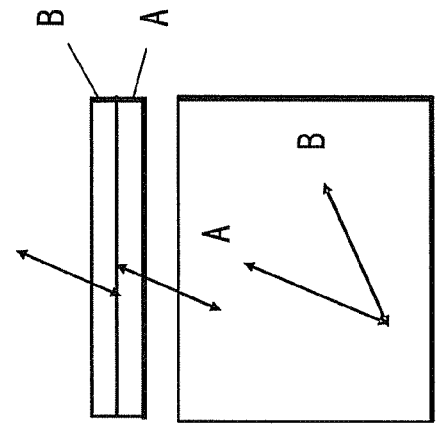

With the abovementioned configuration of the half-wave plates 42 described in FIGS. 4A to 4C and combination of arrangement thereof shown in FIGS. 8A to 8C, other suitable combinations will be examined hereinbelow regarding the configuration and arrangement with which the direction of quartz optical axes can be effective in relation to the light beam direction. FIGS. 10A to 10C are schematic drawings viewed from the direction of light incidence, respectively, illustrating the configuration pattern of half-wave plates 42 (the lamination pattern of two single zero-order quartz half-wave plates A and B) which yields the same viewing angle characteristics as FIG. 4B. In addition to the aforementioned configuration pattern of FIG. 4A, three patterns can exist as shown in FIGS. 10A, 10B, and 10C. With these patterns, four in total, as shown in FIG. 11A, each pattern has a combination by rotated in plane by 180 degrees to be point-symmetric between the right and left halves of the PS converter 7, resulting in four ways of combination in total.

Figures 11A, 11B, 11C, 11D:
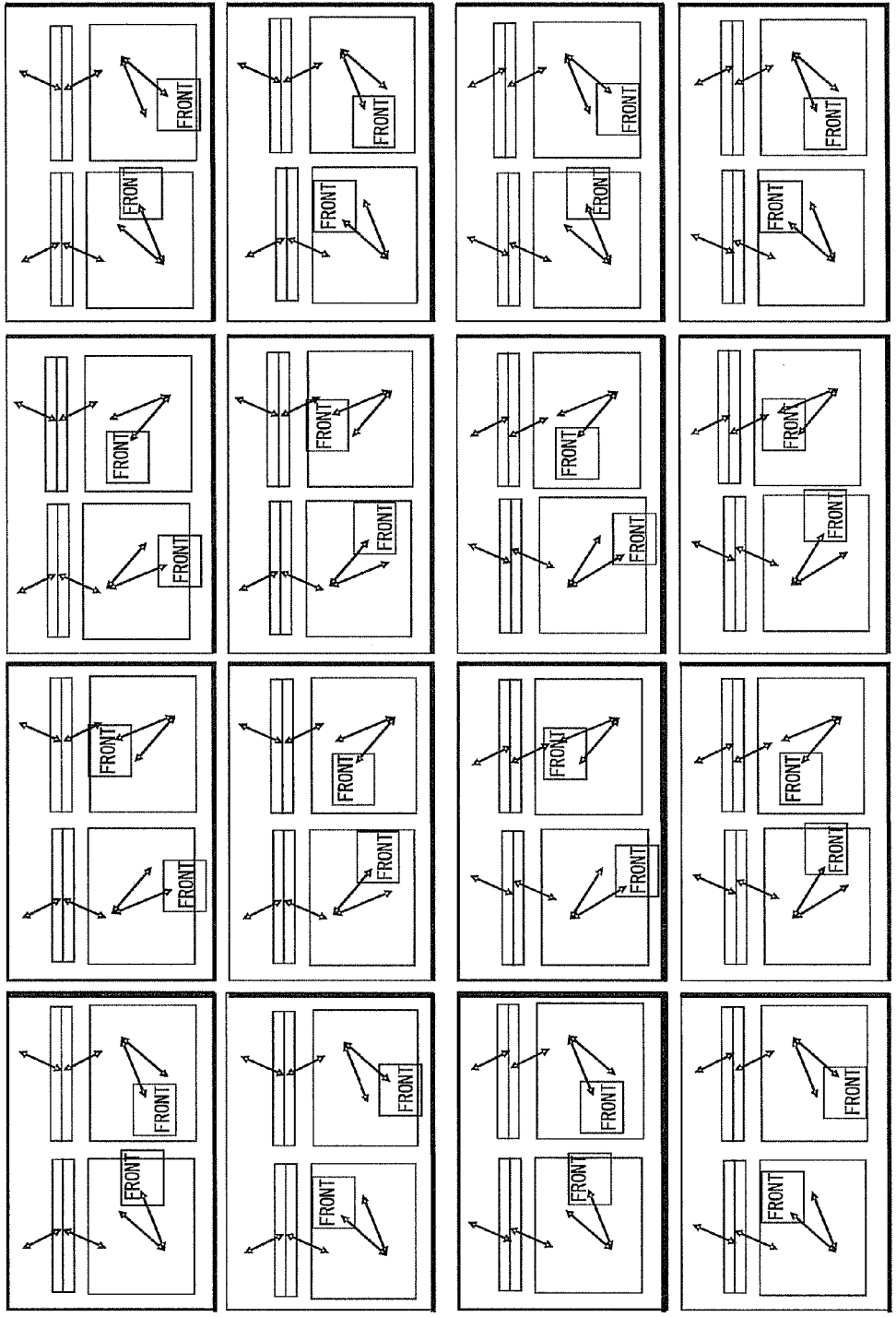
FIGS. 11A through 11D are drawings schematically illustrating the configuration of half-wave plates included in PS converter viewed from the direction of light incidence, the configuration pattern of half-wave plates being prepared after the three patterns shown in FIGS. 10A, 10B, and 10C, in which the direction of quartz optical axes can effectively function relative to the direction of light beams.

In addition, since light beams are considered to be distributed concentrically, viewing angle characteristics are unaffected by the rotation by 90 degrees in plane for each pattern of FIG. 11A. As a result, four ways of combination also exist as shown in FIG. 11B.

In addition, since the viewing angle characteristics are unchanged by replacing the combinations of FIG. 11B with those of FIG. 11C, four more ways of combination also exist as shown in FIG. 11C.

Still in addition, since the viewing angle characteristics are the same when the combinations of FIG. 11C are each rotated by 90 degrees in plane, more combinations of four ways also exist as shown in FIG. 11D.

Therefore, there are sixteen possible ways of the combination, in which the direction of quartz optical axes can effectively function relative to the direction of light beams.

Figure 12:
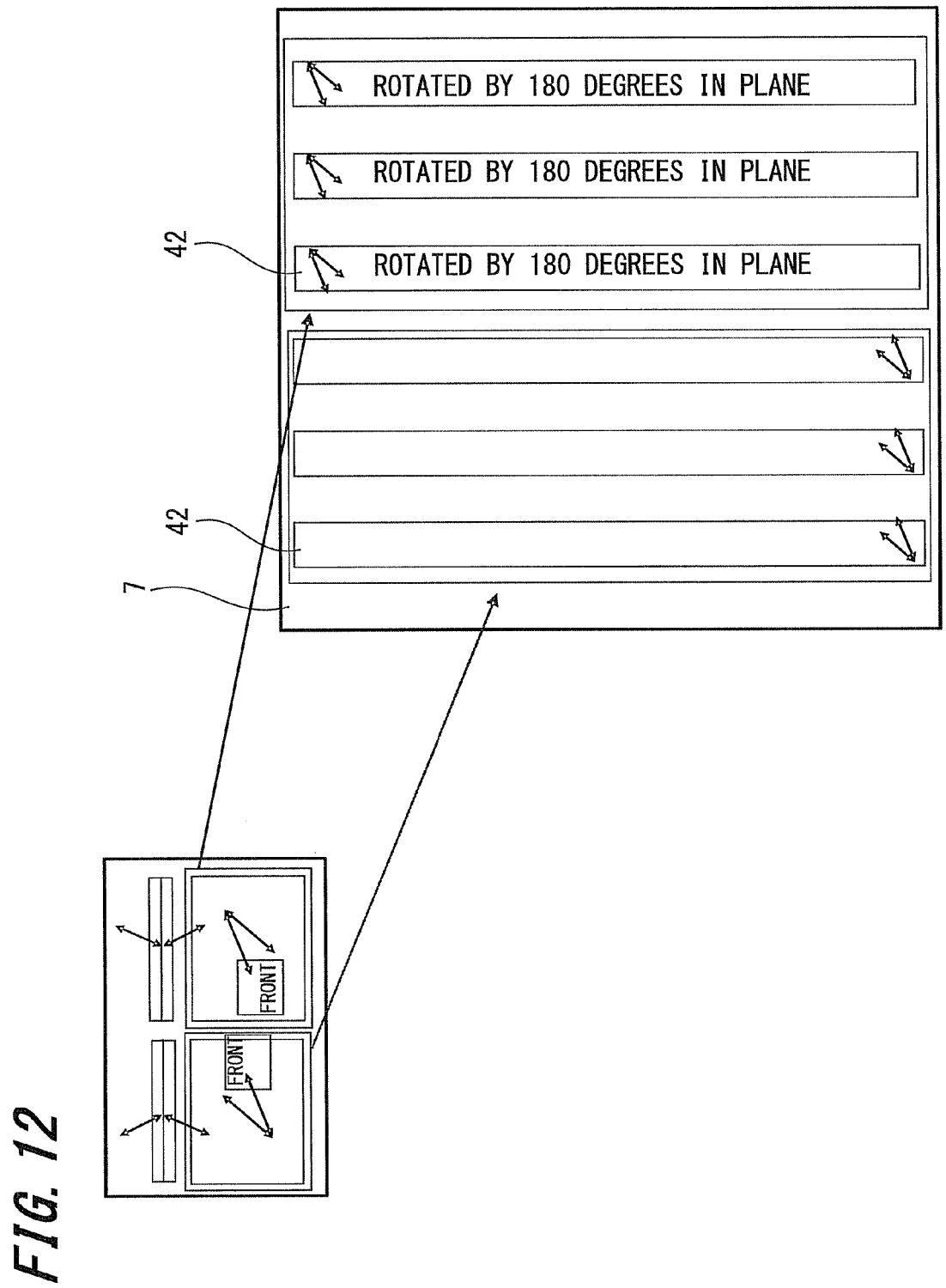
FIG. 12 is a drawing schematically illustrating the manner of laminating half-wave plates to form the PS converter shown in FIGS. 8A, 8B, and 8C viewed from the direction of light incidence.

FIG. 12 is a drawing schematically illustrating the manner of laminating half-wave plates 42 shown in FIGS. 8A to 8C to the PS converter 7, viewed from the direction of light incidence. The half-wave plates 42 are laminated with the alignment direction different between the right and left halves of the PS converter 7 (by rotating the half-wave plates 42 in the right half portion by 180 degrees in plane, when viewed relative to the half-wave plates 42 in the left half portion as the reference).

In addition, in stead of dividing the PS converter 7 into the right and left halves as mentioned above, it is also effective to divide each rectangular slab of the half-wave plate 42 into its right and left halves, and to thereby form the combination of the right and left halves as shown in FIGS. 11A thorough 11D. FIGS. 13A and 13C are drawings illustrating the examples of such combinations as mentioned above, which are illustrated in a similar manner to FIGS. 8A to 8C. With such configuration, sixteen more ways of combination are added.

Since the quartz used presently is of single crystal, there is a certain limitation in size for the crystal to grow. Moreover, the technology of slicing and polishing as thin the crystal becomes more difficult as wafer size increases. Therefore, for forming a PS converter of large size, it is also advantageous to use a method of first dividing the half-wave plate portion into two, top and bottom, for example, and then joining the two together to form one large structure.

When dividing the half-wave plate portion, it is preferable to optimize the direction of crystal axes to be point-symmetric, in consideration of the fact that light beams disperse concentrically. In the case where the distribution of light intensity is not point-symmetric due to decentering, for example, it is preferable to optimize the alignment in response to the angular, and intensity distribution of the light incident on the half-wave plate. FIG. 14 is a drawing viewed from the direction of light incidence, illustrating the manner of laminating the half-wave plates 42 to form a PS converter 7, in which each of the half-wave plates 42 is divided into top and bottom portions to be subsequently arranged to form the point-symmetric alignment under the assumption of an illumination optics with the light intensity stronger for the beams directed from outside to inside.

When the angular, and intensity distribution of the incident light is considered as point-symmetric, it is preferred as optimization steps of the alignment of half-wave plates 42, to optimize first with respect to half-wave plates 42 in a first quarter portion of PS converter 7. Subsequently, the half-wave plates in each of remaining quarter portions are successively optimized by rotating 90 degrees starting from the first quarter alignment and on, as shown in FIG. 14. In addition, in the case where the distribution of light intensity is not point-symmetric due to decentering of fly's eye lens as a constituent of the integrator disposed in front of the PS converter 7, for example, it is preferable to optimize the alignment of the half-wave plates 42 on each of remaining quarter portions in response to the present distribution of the light intensity.

While each of the half-wave plates 42 is divided equally into top and bottom portions in the illustration of FIG. 14, the number of the portions may alternatively be three or more, with the resulting divided portions being not necessarily equal in size with each other. Moreover, even in the abovementioned case of dividing into two, each of the half-wave plates 42 may alternatively be divided not equally but to be different in size depending on the design of fly's eye lenses.

Although the arrangements of FIGS. 11A to 11D, 13A to 13C, and 14 have been used in the abovementioned embodiments, with the assumption in that an illumination optics has light intensity stronger for the beams directed from outside to inside, the arrangement may be reversed for illumination optics with the light intensity reversed, i.e., being stronger for the beams directed from inside to outside. In such a case, the arrangement may be made to direct toward the direction to increase the transmittance of the stronger beams referring to viewing angle characteristics of single wavelength plate.

Depending on design concept of the illumination optics, the angular distribution of the light beams may vary to a certain extent. An embodiment of the present invention becomes more effective with the increase of the angle of light beams and of the deviation of light intensity.

When the direction of axes of quartz are aligned, as mentioned above, to be advantageous in response to the angular, and intensity distribution of light beams on the outgoing surface of the PS converter, the optics can be used without causing luminance unevenness even if optical characteristics of single wavelength plate are not uniform over all light angles. In the abovementioned embodiments, each quartz wavelength plate as the constituent of the half-wave plates 42, has been designed with the thickness to yield the phase difference equal to λ/2 at the wavelength of 520 nm. However, if the quartz plate can be designed to have a thickness to yield a phase difference equal to λ/2 at the wavelength of 480 nm, and to have that thickness to be as small as about 0.3 mm for the laminated two in total, the uniformity can further be improved and comparable characteristics can be achieved as those of film wavelength plate in terms of usage. Moreover, the angular dependence of light beams can be decreased further and a sufficient brightness can be secured.

With respect to the single quartz wavelength plate, costs merit can be offered since two identical wafers are prepared and then laminated in this method in place of the complicated design such as disclosed in the aforementioned Japanese Unexamined Patent Application Publication No. 2004-170853. In addition, since the thickness of wavelength plates can be relatively large, difficulties during processing can be reduced. As a result, the method can offer more advantages for practical use. With the use of PS converter according to an embodiment of the present invention, cooling air flow can be decreased or even eliminated, and fan noise can be reduced and quiet performance be therefore effected.

While this invention is applied to the transmission projector in the abovementioned embodiments, this invention can also be applied to a reflection projector since the design of the illumination optics of the transmission type is basically the same as the reflection type.

In addition, although quartz as a positive uniaxial crystal is used for forming half-wave plates 42 in the abovementioned embodiments, it may be mentioned that similar effects can be obtained with a crystal other than the quartz (even calcite, for example) as long as the crystal being uniaxial and capable of generating phase differences with its optical axis cut aslant.

Further, as the half-wave plate 42 of PS converter 7, an inorganic material, or other similar material may alternatively be used, which is of other than uniaxial and having deviation in the viewing angle characteristics. The thus formed half-wave plate 42 may subsequently be aligned toward the direction so as to increase the conversion efficiency of light beams directed in the direction of high intensity among incident light beams distributed at various angles.

In addition, in the abovementioned embodiments, the configuration of phase difference plate of the projection image display apparatus according to an embodiment of the present invention is applied as the half-wave plate included in PS converter. In the illumination optics of the projector, however, phase difference plates are used in several locations other than the PS converter. As shown in FIG. 1, for example, half-wave films 30 and 31 which are disposed before the color composition prism 32, are used to convert the blue and red light beams outgoing from polarizing plates 27 and 29, respectively, from P polarization into S polarization.

Moreover, since the illumination optics of the projection image display apparatus is a polarization optical system, not only half-wave plate but also other various phase difference plates (including quarter-wave plate and λ-plate) may be used.

In addition, when the light intensity distribution is analyzed at various locations in the illumination optics of the projector, a certain degree of deviation is generated for incident light beams being distributed at various angles depending on the location.

Accordingly, as phase difference plates used in other locations than PS converter of the illumination optics, those with deviation in the viewing angle characteristics may alternatively be used by optimizing the alignment direction of the phase difference plates in response to the deviation of light intensity at each location (aligning so as to yield a desirable phase difference for the light directed in the direction of high intensity). As a result, the luminance, chromaticity, uniformity, and production costs may be improved at a time in similar manner as mentioned above.

It should be understood by those skilled in the art that various modifications, combinations, sub-combinations and alterations may occur depending on design requirements and other factors insofar as they are within the scope of the appended claims or the equivalents thereof.

What is claimed is:

1. A projection image display apparatus, comprising:
   a light source; and
   illumination optics configured to form an image on a liquid crystal panel with light emitted from the light source, the illumination optics comprising:
      a polarization converter comprising a first half-wave plate and a second half-wave plate, the polarization converter configured to separate the light emitted from the light source into light of a first polarization and light of a second polarization, and align a direction of polarization of outgoing light by allowing at least a first portion of the light of the first polarization to pass through the first half-wave plate and allowing at least a second portion of the light of the first polarization to pass through the second half-wave plate, wherein the first polarization is orthogonal to the second polarization;
      wherein the first half-wave plate and the second half-wave plate are disposed in a plane; and
      wherein a first optical axis of the first half-wave plate is aligned to be point symmetric in the plane with a second optical axis of the second half-wave plate;
      wherein the first half-wave plate and the second half-wave plate are each divided into either top and bottom halves or left and right halves, the two halves of the first half-wave plate arranged to be point symmetric with each other and the two halves of the second half-wave plate arranged to be point symmetric with each other.

2. The projection image display apparatus according to claim 1,
   wherein the light of a first polarization is P-polarized light or S-polarized light.

3. The projection image display apparatus according to claim 1, wherein
   the first half-wave plate and the second half-wave plate are formed of an inorganic material.

4. The projection image display apparatus according to claim wherein
   the inorganic material is a uniaxial crystal with a phase difference generated by cutting an optical axis thereof aslant.

5. A polarization converter configured to separate P-polarized light and S-polarized light from a light source and align a polarization direction of outgoing light, the polarization converter comprising:
- a first half-wave plate configured to allow one of the P-polarized light and the S-polarized light to pass through,
- a second half-wave plate configured to allow one of the P-polarized light and the S-polarized light to pass through,
- wherein the first half-wave plate and the second half-wave plate are disposed in a plane,
- wherein a first optical axis of the first half-wave plate is aligned to be point symmetric in the plane with a second optical axis of the second half-wave plate, and
- wherein the first half-wave plate and the second half-wave plate are each divided into either top and bottom halves or left and right halves, the two halves of the first half-wave plate arranged to be point symmetric with each other and the two halves of the second half-wave plate arranged to be point symmetric with each other.

6. The polarization converter according to claim 5, wherein the first half-wave plate and the second half-wave plate are formed of an inorganic material.

7. The polarization converter according to claim 6, wherein the inorganic material is a uniaxial crystal with a phase difference generated by cutting an optical axis thereof aslant.

* * * * *